(12) United States Patent
Strobel et al.

(10) Patent No.: US 11,146,310 B2
(45) Date of Patent: Oct. 12, 2021

(54) PARTIAL ECHO CANCELLATION DUPLEXING

(71) Applicant: Intel Corporation, Santa Clara, CA (US)

(72) Inventors: Rainer Strobel, Munich (DE); Vladimir Oksman, Morganville, NJ (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 16/481,992

(22) PCT Filed: Jan. 4, 2018

(86) PCT No.: PCT/US2018/012290
§ 371 (c)(1),
(2) Date: Jul. 30, 2019

(87) PCT Pub. No.: WO2018/164763
PCT Pub. Date: Sep. 13, 2018

(65) Prior Publication Data
US 2019/0393927 A1 Dec. 26, 2019

Related U.S. Application Data

(60) Provisional application No. 62/469,850, filed on Mar. 10, 2017.

(51) Int. Cl.
*H04B 1/38* (2015.01)
*H04B 3/32* (2006.01)
(Continued)

(52) U.S. Cl.
CPC ............. *H04B 3/32* (2013.01); *H04B 3/487* (2015.01); *H04L 5/14* (2013.01)

(58) Field of Classification Search
CPC ......... H04B 3/32; H04B 3/487; H04L 5/0037; H04L 5/0048; H04L 5/14; H04L 5/22; H04L 5/0023; H04M 11/062
See application file for complete search history.

(56) References Cited

U.S. PATENT DOCUMENTS 6,714,520 B1 * 3/2004 Okamura ............. H04L 5/0046
370/286
7,274,734 B2 * 9/2007 Tsatsanis ................ H04L 5/023
375/222
(Continued)

FOREIGN PATENT DOCUMENTS

CN 1863099 A 11/2006
CN 1965498 A 5/2007
(Continued)

OTHER PUBLICATIONS

International Search Report dated Mar. 20, 2018 for International Application No. PCT/US2018/012290.
(Continued)

*Primary Examiner* — Phuc H Tran
(74) *Attorney, Agent, or Firm* — 2SPL Patent Attorneys PartG mbB; Yong Beom Hwang

(57) ABSTRACT

Methods, circuitries, and systems for transmitting data upstream between a first device and a second device and downstream between the second device and the first device are disclosed. A method includes determining an upstream crosstalk effect for an upstream channel and determining a downstream crosstalk effect for a downstream channel. The crosstalk effect includes near end crosstalk from a third device that is non-co-located with respect to the first device and the second device. A data rate of an upstream transmission or downstream transmission is adjusted based on the upstream crosstalk effect and the downstream crosstalk effect.

16 Claims, 6 Drawing Sheets

(51) Int. Cl.
   *H04B 3/487*     (2015.01)
   *H04L 5/14*      (2006.01)

(56)            References Cited

U.S. PATENT DOCUMENTS

| 9,544,423 B2* | 1/2017 | Wei .................... H04M 3/304 |
| 2012/0121029 A1* | 5/2012 | Ahrndt ................ H04L 5/0023 |
| | | 375/260 |
| 2017/0063569 A1* | 3/2017 | Currivan ............ H04L 27/2613 |
| 2018/0375613 A1* | 12/2018 | Byun .................... H04L 1/00 |
| 2019/0044813 A1* | 2/2019 | Oksman ................ H04L 45/16 |

FOREIGN PATENT DOCUMENTS

| CN | 105723790 A | 6/2016 |
| EP | 1050988 A1 | 11/2000 |
| EP | 3104532 A1 | 12/2016 |
| WO | 2011/006529 A1 | 1/2011 |

OTHER PUBLICATIONS

Hansen, Chris et al. "G.lite Draft Document." Question: Q4/15. Study Grp 15. Geneva, Switzerland Oct. 12-23 ITU—Telecommunication Standardization Sector.
International Preliminary Report on Patentability dated Sep. 20, 2019 for International Application No. PCT/US2018/012290.
Hansen, Chris: "G.lite Draft Document", ITU—Telecommunication Standardization Sector, Study Group 15, Geneva, Switzerland, Nov. 11, 2004, pp. 1-174.

* cited by examiner

Full EC Duplex Framing

Partial TD/EC Framing

Partial TD/FD/EC Framing

PARTIAL ECHO CANCELLATION DUPLEXING

CROSS REFERENCE TO RELATED APPLICATIONS

This application is a National Phase entry application of International Patent Application No. PCT/US2018/012290 filed on Jan. 4, 2018, which claims priority to U.S. Provisional Patent Application Ser. No. 62/469,850, filed on Mar. 10, 2017, entitled "PARTIAL ECHO CANCELLATION DUPLEXING FOR MULTI-USER ACCESS OVER CABLE BINDERS" in the name of Rainer Strobel et al. and is hereby incorporated by reference in its entirety.

BACKGROUND

Increase of the data rate is an important goal in communication systems. Full duplex transmission, using the same transmit time and frequency for upstream and downstream transmission, and applying echo cancellation is one method to increase data rates, especially for cases where a symmetric upstream/downstream ratio and low latencies are required. In echo cancellation, a model of the echo path is created and used to estimate an echo for a signal being transmitted. This estimated echo is then subtracted from the received signal to increase the signal-to-noise ratio.

DESCRIPTION

Figure 1:
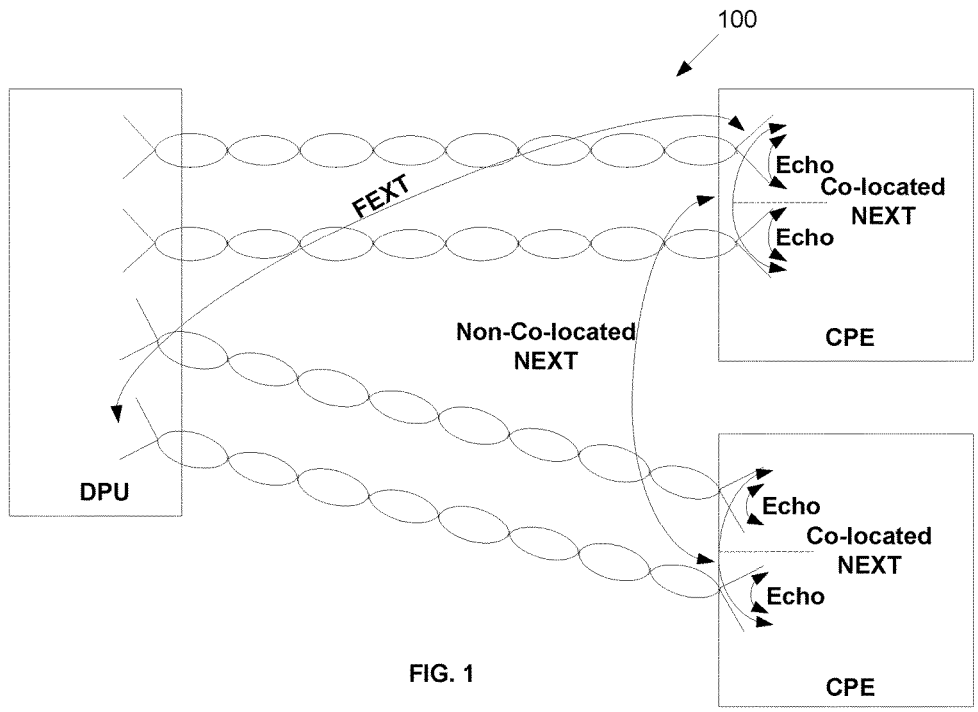
FIG. 1 illustrates an example multi-user twisted pair network with two independent non-co-located users.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure.

In addition, features of the different embodiments described hereinafter may be combined with each other, unless specifically noted otherwise.

A phone line network often consists of cable binders with multiple twisted pairs, serving multiple subscribers. In multi-pair binders near-end crosstalk (NEXT) between different subscribers is present both at the distribution point (DPU) and at the customer premises equipment (CPE) end. Echo cancellation is usually feasible at both the DPU and the CPE end of the line because the transmit signal is known to the local receiver. However, this not necessarily the case for NEXT. At the DPU, where all the lines are co-located, NEXT sources are usually known to local receivers, but at the CPE side NEXT signals may come from a neighboring, non-co-located CPE.

On a single line full duplex can be used as limited by line attenuation or depth of echo cancellation. In point-to-point MIMO, the NEXT between the transmitters and receivers of different lines can be cancelled in addition to echo cancellation because all transmit signals are available to the receiver at the same physical location.

In a multi-subscriber case, NEXT can be cancelled at the DPU, but can't be cancelled between CPEs since the CPEs are not co-located, which substantially limits the downstream data rates for full duplex. Therefore, full duplex in multi-subscriber lines is currently only possible for cases in which NEXT is weak, which happens at very low frequencies or in very specific deployment scenarios. Neither of these cases are applicable for generic high-speed access networks over twisted pairs or similar metallic access.

Current G.fast systems use time division duplexing (TDD) to separate upstream and downstream transmission in time to eliminate NEXT. Legacy xDSL systems apply echo cancellation (e.g., HDSL or SHDSL) and operate at rather low frequencies where NEXT is relatively small and cancellation of echo is sufficient.

High frequency full duplex transmission systems such as Gigabit Ethernet (IEEE 1GBaseT standard) and 10 Gigabit Ethernet (IEEE 10GBaseT standard) use co-located transceivers with MIMO techniques to avoid self-NEXT and use special shielded cables to avoid NEXT from other cables of the multi-user cable bundle. Multi-user detection has also been used to address NEXT in multi-user scenarios. However, this solution is highly complex and suffers from accuracy problems. Thus, there are no satisfactory current solutions providing full duplex operation for lines deployed in a generic multi-user cable binder (i.e., cable binders serving non co-located users).

FIG. 1 illustrates an example of a multi-user twisted pair network 100 with two independent non-co-located subscribers (i.e., CPE). In the example, each CPE is connected to a DPU using two pairs of wires. The two pairs of wires per CPE embody a 2-pair bonding solution, to increase the data rate. In this case, full NEXT cancellation is only possible at the DPU side, where all transmit and receive signals are co-located. Similarly, NEXT at the CPE side could be cancelled between two pairs connecting each CPE. However, the CPE does not know the transmit signal of the other CPE and therefore NEXT between the two CPEs cannot be cancelled. At high frequencies, NEXT between the CPEs becomes the dominant disturber of the downstream and thus full duplex transmission becomes inefficient for certain frequencies. Therefore it is important to mitigate, as much as possible, the signal-to-noise ratio (SNR) degradation caused by NEXT from non-co-located CPEs. Far end crosstalk (FEXT) that occurs between lines of both co-located and non-co-located CPEs can be cancelled using vectoring techniques employed in G.fast or vectored VDSL2 (as per ITU-T G.993.5).

Described herein are techniques that allow estimation of the crosstalk effects in the upstream and downstream channels between independent non-co-located subscribers when the line is initiated. These estimations are updated during routine transmission and reception of data frames (often called "showtime"). Further, based on the obtained estimations, partial echo cancellation (EC) may be performed in which transmission times and/or transmission powers in different lines are adjusted on a per frequency basis in upstream and downstream transmission directions so that the impact of NEXT is substantially reduced. The amount of overlap in time and frequency during partial EC operation can be tuned to maximize data rate for every particular channel condition for any given performance optimization criteria.

The described systems, methods, and circuitries allow multi-user full duplex transmission using echo cancellation, even in scenarios when NEXT can't be cancelled due to a lack of knowledge of the disturbing signal. The invention identifies transmit times, frequencies, and transmit signal levels that allow efficient use of echo cancellation. For parts of the transmission time and the transmit spectrum in which simultaneous upstream and downstream transmission is not feasible, NEXT or echo or both are avoided (by use of TDD or FDD duplexing).

Figure 2:
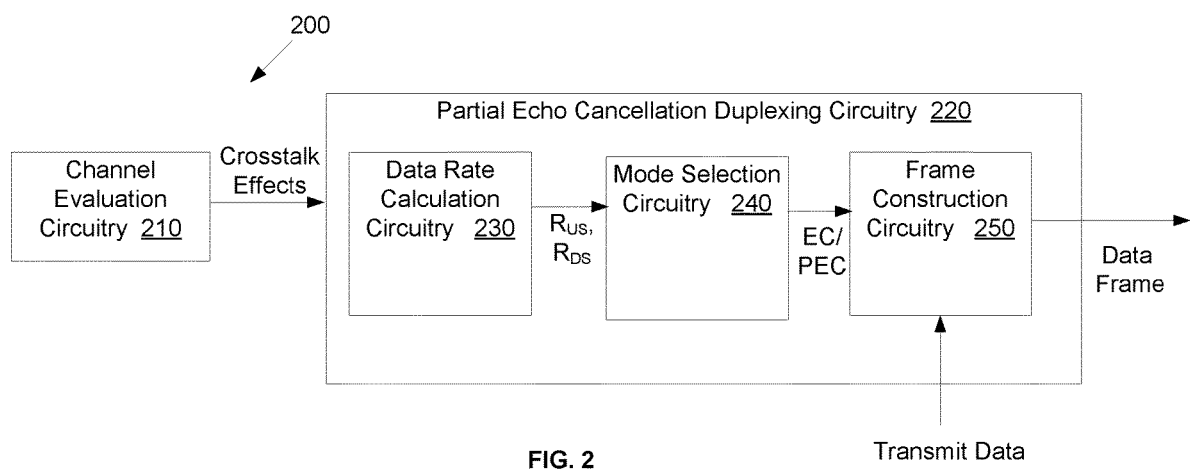
FIG. 2 illustrates an example partial echo cancellation system that supports transmission using partial echo cancellation duplexing in accordance with various aspects described.

FIG. 2 illustrates an example partial echo cancellation duplexing system 200 that adjusts the data rate of transmissions using partial echo cancellation techniques. In one example, the system 200 is implemented in a DPU, and controls transceivers in the DPU as well as in the CPEs. The system 200 includes channel evaluation circuitry 210 and partial echo cancellation circuitry 220. The channel evaluation circuitry 210 is configured to determine crosstalk effects such as SNR, and/or NEXT echo coupling, and/or FEXT echo coupling for the upstream and downstream channels in a manner that takes into account NEXT and/or FEXT from non-co-located devices. The partial echo cancellation circuitry 220 is configured to use partial echo cancellation to, when necessary, adjust the data rate to compensate for the NEXT and/or FEXT.

The partial echo cancellation circuitry 220 includes data rate calculation circuitry 230, mode selection circuitry 240, and frame construction circuitry 250. The data rate calculation circuitry 230 is configured to calculate an upstream (US) data rate $R_{US}$ and a downstream (DS) data rate $R_{DS}$ based on the crosstalk effects determined by the channel evaluation circuitry 210. The mode selection circuitry 240 is configured to select a full echo cancellation duplexing mode or partial echo cancellation duplexing mode based on target data rates. The frame construction circuitry 250 is configured to control the construction and transmission of upstream and downstream data frames to implement the selected echo cancellation duplexing mode.

Figure 3:
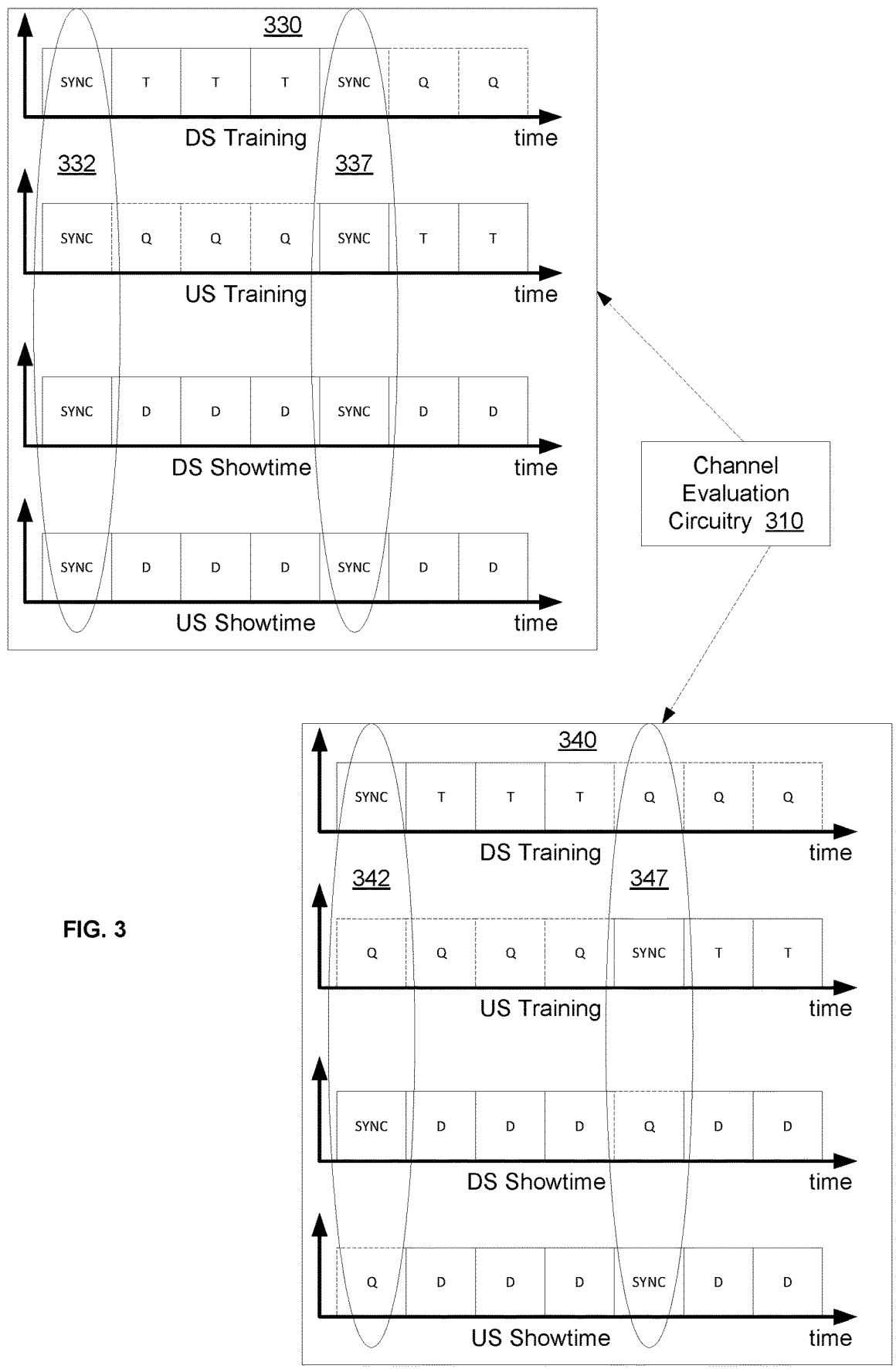
FIG. 3 illustrates examples of probe sequences that may be generated by the system of FIG. 2 to determine crosstalk effects and to perform channel estimation in accordance with various aspects described.
Figure 4:
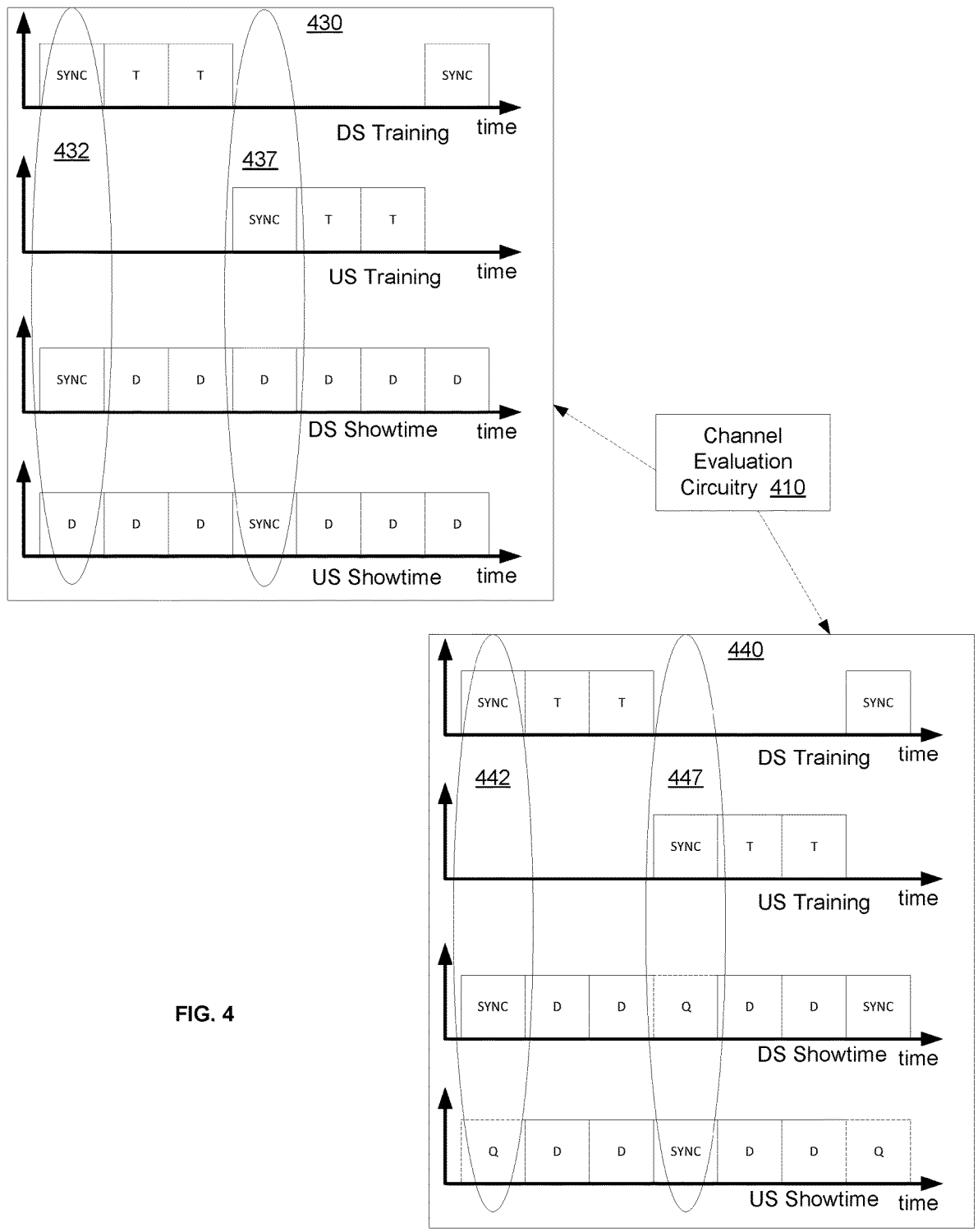
FIG. 4 illustrates additional examples of probe sequences that may be generated by the system of FIG. 2 to determine crosstalk effects and to perform channel estimation in accordance with various aspects described.

FIGS. 3 and 4 illustrate two examples of probe frames that may be generated by a channel evaluation circuitry 310, 410, respectively, to determine crosstalk effects. The crosstalk effects are determined based on the knowledge of the channel, which includes the direct channel, and crosstalk channels (FEXT and NEXT). Estimation of direct and FEXT channels for multi-line cable binders and non-co-located CPEs is widely used in the existing systems, such as vectored VDSL2 (ITU-T G.993.5) and G.fast (ITU-T G.9701). Estimation of NEXT between lines with co-located inputs and outputs is also well known in MIMO techniques.

However, no techniques are known to estimate NEXT from a non-co-located CPE, which is a key problem in full duplex operation in a multi-user environment.

FIG. 3 illustrates a NEXT and FEXT evaluation technique in which the channel evaluation circuitry 310 generates aligned probe symbols for joint NEXT/FEXT Evaluation. In the case of full duplex, NEXT and FEXT evaluation can be done jointly. For this the channel evaluation circuitry 310 generates DS and US symbols carrying probe sequences that are aligned in time. In the illustrated probe sequences, seven symbol "positions" are depicted. Each position either carries a data symbol ("D"), a SYNC symbol, or is a quiet position (Q). For the purposes of this description, a quiet position and a blank or empty symbol in the frame are to be considered as the same.

Referring now to FIG. 3, a first set of probe sequences 330 and a second set of sequences 340 are shown. In both sets, a joining line during its training uses time division duplexing (TDD) to avoid echo, until the echo canceler is sufficiently trained as shown in the training sequences. The symbol positions filled with training symbols are denoted "T."

To identify NEXT and FEXT channels from multiple lines, special pre-defined sequences (further called "probe sequences", which are usually mutually orthogonal, such as Walsh-Hadamard sequences, or pseudo-orthogonal, such as M-sequences) are transmitted by each CPE on all relevant tones of the pre-defined upstream symbols and by the DPU on pre-defined downstream symbols (SYNC symbols in FIGS. 3 and 4). All upstream SYNC symbol positions of all lines are mutually aligned in time. All downstream SYNC symbol positions are also mutually aligned in time. To accommodate different delays in different lines, appropriate cyclic extension may be applied. In one example, instead of two SYNC symbol positions per frame, a single SYNC symbol position is used per frame to estimate both upstream and downstream NEXT and/or FEXT.

The channel estimation circuitry 310 estimates the channel on all tones used for transmission or on a subset of tones. In case of channel estimation on a subset of tones, the channel estimation for intermediate tones is derived from the estimated tones, e.g., by interpolation. In estimating the channel, the channel estimation circuitry 310 determines crosstalk effects such as SNR, and/or NEXT echo coupling, and/or FEXT echo coupling for the upstream and downstream channels in a manner that takes into account NEXT and/or FEXT from non-co-located devices.

FIG. 3 shows an example of a joining line operating in TDD mode (during relevant part of its training) and an "operation" line (i.e., during "showtime" as opposed to training) operating in full duplex. Two approaches are shown in FIG. 3. The set of sequences 330 shows the case in which downstream SYNC symbols in a first symbol position 332 and the upstream SYNC symbols in a second symbol position 337 are aligned in time, and all lines transmit probe sequences over SYNC symbols in both upstream and downstream directions. As upstream and downstream sequences are mutually orthogonal, all crosstalk channels (FEXT in upstream and downstream and NEXT in upstream and downstream) can be estimated. During the first SYNC position 332, downstream channel SNR is measured and downstream channel FEXT and downstream channel NEXT (DPU side) are estimated by the channel estimation circuitry 310. Echo estimation is also performed during the first SYNC position 332. During the second SYNC position 337, upstream channel SNR is measured and upstream FEXT and NEXT (CPE side) are estimated by the channel estimation circuitry 310. Echo estimation is also performed during the second SYNC position 337.

In the example shown in the set of sequences 340 the downstream SYNC symbol transmission during the second NEXT channel estimation symbol position 347 (NEXT-TS) is stopped in both joining and showtime lines (quiet periods are assigned) to avoid a downstream FEXT component being present in the NEXT estimation. This can be achieved by sending a quiet downstream SYNC symbol (without probe sequence or with a probe sequence containing only zero-power (Z) elements) at the same position as an upstream SYNC symbol. Analogously, a quiet symbol is sent upstream while a SYNC symbol is sent downstream in symbol position 342. During the first SYNC position 342, downstream channel SNR is measured and downstream channel FEXT and downstream channel NEXT (DPU side) are estimated by the channel estimation circuitry 310. Echo estimation is also performed during the first SYNC position 342. During the second SYNC position 347, upstream channel SNR is measured and upstream FEXT and NEXT (CPE side) are estimated by the channel estimation circuitry 310. Echo estimation is also performed during the second SYNC position 347.

In one example, to estimate the NEXT and FEXT the DPU collects error signals after one or more repetitions of the probe sequence transmission, while the transmit PSD of the subcarriers of the SYNC symbol is unchanged. The DPU indicates to the CPEs via the DS management channel when the sufficient number of probe sequence cycles is collected. Further, the DPU can start downstream transmission of (data or management information) in the previously released NEXT-TS positions.

In another example, the DPU may use a joint iterative process for FEXT/NEXT estimation which includes adaptation of the transmit power of the subcarriers in both the upstream and downstream SYNC symbols. After receiving a set of error signals from all CPEs, the DPU communicates to each CPE via the downstream management channel what transmit power should be set to each subcarrier of the upstream SYNC symbols for the next set of reported error signals. Further, the DPU updates the transmit power of the subcarriers in downstream SYNC symbols and CPEs update the power of the subcarriers in the upstream SYNC symbols, so that next set of error signals is obtained with modified transmit powers in both directions. The process converges when DPU concludes that sufficient number of iterations was already performed. LMS algorithm is one typical type of iterative process.

In another example, the probe sequences carry random values (such as PRBS or user data) and DPU runs an iterative process updating the transmit power of US subcarriers during SYNC symbols, as described above. The convergence process for this example is usually relatively slow. In another example, the DPU transmits SYNC symbols on the NEXT-TS positions carrying probe sequences containing only Z-elements.

In another example, downstream SYNC symbols are precoded at the DPU side to cancel FEXT and the upstream SYNC symbols are equalized at the DPU side. In another example, downstream SYNC symbols are not precoded at the DPU side and upstream SYNC symbols are not equalized at the DPU side, such that the SYNC symbols experience the full FEXT.

In another example, NEXT and echo are cancelled during the SYNC symbols and only the residual NEXT and echo are estimated. This can be used in upstream as well as in downstream direction (in case NEXT is from a co-located transceiver), e.g., to run adaptive algorithms for NEXT canceler training. In another example, NEXT and echo are not cancelled during the SYNC symbols and the channel estimation contains full NEXT and echo. This can be used in upstream as well as in downstream direction, in case of an open-loop update of the NEXT and echo canceller with sub-sequent channel estimation and canceler calculation steps.

FIG. 4 illustrates an example channel estimation circuitry 410 that performs crosstalk effect evaluation without aligned probe symbols so that FEXT and NEXT are evaluated independently. Joining lines, as in FIG. 3, start from the TDD frame format. The downstream and upstream SYNC symbols in the first SYNC symbol position 432 are placed in the probe sequences at different symbol positions (while downstream SYNC symbols in all lines are mutually aligned and upstream SYNC symbols in second SYNC position 437 in all lines are mutually aligned). By using TDD, a joining line may avoid echo until the echo canceler is trained sufficiently accurate. In the example shown in FIG. 4, it is not required to select probe sequences such that upstream and downstream probe sequences in SYNC symbols are mutually orthogonal. Only upstream probe sequences of different lines should be mutually orthogonal. In the set of sequences 430, the showtime lines transmit data at the upstream SYNC symbol positions of the training lines, which may reduce the channel estimation quality due to NEXT from the operation lines. During the first SYNC position 432, downstream channel SNR is measured and downstream channel FEXT and downstream channel NEXT (DPU side) are estimated by the channel estimation circuitry 410. Echo estimation is also performed during the first SYNC position 432. During the second SYNC position 437, upstream channel SNR is measured and upstream FEXT and NEXT (CPE side) are estimated by the channel estimation circuitry 410. Echo estimation is also performed during the second SYNC position 437.

The quality of the channel estimation is improved in the set of sequences 440 by transmitting quiet symbols on the showtime lines at the upstream SYNC symbol positions of the training lines. During the first SYNC position 442, downstream channel SNR is measured and downstream channel FEXT and downstream channel NEXT (DPU side) are estimated by the channel estimation circuitry 410. Echo estimation is also performed during the first SYNC position 442. During the second SYNC position 447, upstream channel SNR is measured and upstream FEXT and NEXT (CPE side) are estimated by the channel estimation circuitry 410. Echo estimation is also performed during the second SYNC position 447.

Further, during showtime, NEXT estimation is routinely updated and the set of sequences 330 or 430 can be used. Since SYNC symbols are usually transmitted once during a superframe, loss of one downstream symbol position per superframe causes insignificant performance loss. It may also be combined with discontinuous operation (DO) as currently defined in G.fast (G.9701).

In one example, the DPU collects error signals after one or more repetitions of the upstream probe sequences transmission, while the transmit PSD of the subcarriers of the upstream SYNC symbols are unchanged. The DPU indicates to the CPEs via the downstream management channel when the sufficient number of probe sequence cycles is collected. In another example, the probe sequences in upstream carry pseudo-random random bit values (such as PRBS or user data) and DPU runs an iterative process updating the transmit power of US subcarriers during SYNC symbols, as described above. The convergence process for this example is usually relatively slow.

Now that several channel estimation techniques have been described, partial echo cancellation will be set forth in detail. The partial echo cancellation techniques may be performed by the partial echo cancellation circuitry 220 of FIG. 2. Recall that the data rate calculation circuitry 230 is configured to calculate upstream and downstream data rates in the presence of NEXT. In cases when a full overlap of upstream and downstream transmit time and transmit spectrum (i.e., full EC duplexing) is not optimal to achieve the highest data rate (due to impact of NEXT or inability to perfectly cancel echo), mode selection circuitry 240 may select partial echo cancellation duplexing mode. As will be described in more detail below, partial echo cancellation duplexing mode may be implemented in three different manners. Partial echo cancellation duplexing may utilize partial frequency overlap during selected symbol positions in a frame, partial transmit time overlap (during selected symbol positions) in a frame, or a combination of partial time and frequency overlap. In addition, reduction in transmit power can be applied on particular subcarriers or all subcarriers during selected symbol positions in a frame.

In some examples the mode selection circuitry 240 determines specific overlapping and non-overlapping frequencies with respect to the desired upstream/downstream data rate ratio or a target relationship between the upstream and downstream data rates, but also with respect to the receive signal strength and the crosstalk strength within a certain frequency band.

In one example, the mode selection circuitry 240 selects a partial transmit time overlap to allow for control of the ratio between upstream and downstream data rates very efficiently by the corresponding setting of exclusive downstream transmission time, overlapped US/DS transmission time, and exclusive upstream transmission time. The particular allocation of the transmit time, transmit frequency spectrum, and transmit power, different optimization objectives are possible. For example, the mode selection circuitry 240 may select a partial echo cancellation duplexing mode that maximizes a sum-rate (US+DS) or weighted sum-rate $\max(\omega_{us}R_{us}+\omega_{ds}R_{ds})$. In another example, the mode selection circuitry 240 may fix the downstream data rate and select a partial echo cancellation duplexing mode that maximizes the US rate or fix the US rate and select a partial echo cancellation duplexing mode that maximizes the DS rate. In another example, the mode selection circuitry 240 selects a partial echo cancellation duplexing mode that maximizes a sum-rate with a given target US/DS ratio $\omega_{us}/\omega_{ds}$, which corresponds to max $\min(\omega_{us}\widetilde{R}_{us}, \omega_{ds}\widetilde{R}_{ds})$. The settings may be coordinated and optimized among the lines of the vectored group.

To analyze the different schemes, the channel evaluation circuitry 210 determines crosstalk effects and the data rate calculation circuitry 230 calculates data rates for the case of full echo cancellation based on the determined crosstalk effects. Assuming perfect NEXT and FEXT cancellation, the upstream SNR $SNR_{us,v}^{(k)}$ of line v and carrier k can be calculated by the channel evaluation circuitry 210 by:

$$SNR_{us/ds,nextfree,v}^{(k)} = \frac{x_{us,v}^{(k)}|H_{us,vv}^{(k)}|^2}{\sigma^2} \quad (1)$$

where $H_{us,vv}^{(k)}$ is the upstream direct channel of line v, $x_{us,v}^{(k)}$ is the upstream transmit power of line v and carrier k and $\sigma^2$ is the receiver noise variance.

For downstream direction, the NEXT from the neighboring CPEs, connected to the lines $d \in \mathbb{I}_{dist,v}$ cannot be cancelled and is considered as noise, which gives the SNR according to:

$$SNR_{ds,v}^{(k)} = \frac{x_{ds,v}^{(k)} |H_{ds,vv}^{(k)}|^2}{\sigma^2 + \Sigma_{d \in I_{dist,v}} x_{us,d}^{(k)} |H_{cpenext,vd}^{(k)}|^2} \quad (2)$$

where $H_{ds,vv}^{(k)}$ is the downstream direct channel transfer function of line v, $x_{ds,v}^{(k)}$ is the downstream transmit power of line v on carrier k, and $H_{cpenext,vd}^{(k)}$ is the NEXT coupling from the CPE transmitter of line d to the CPE receiver of line v.

The data rate calculation circuitry 240 calculates the data rate on line v (the downstream data rate with/without NEXT or the upstream data rate) for example, by:

$$R_{ds/us/ds,nextfree,v} = \sum_{k=1}^{K} \log_2 \left( \frac{1 + SNR_{ds/us/nextfree,v}^{(k)}}{\Gamma} \right) \quad (3)$$

where $\Gamma$ accounts for the SNR gap to capacity due to QAM modulation, the used channel coding scheme, and the applied SNR margin $\gamma_m$ (required as a condition for the target data error rate).

Figure 5A:
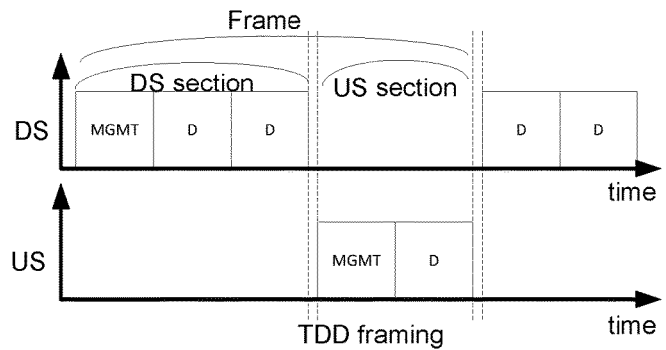
FIGS. 5A-5C illustrate example frames constructed to perform various types of duplexing in accordance with various aspects described.
Figure 5B:
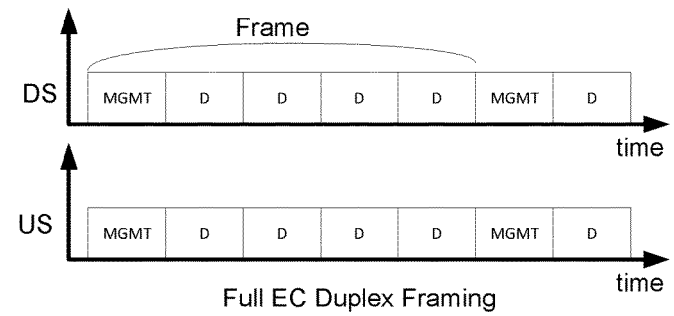
Figure 5C:
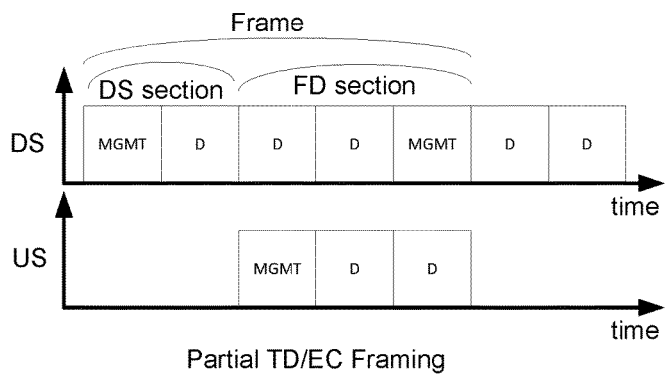

Depending on the associated standard, different duplexing schemes are used in DSL technologies. While G.fast uses TDD, VDSL2 uses FDD. In both cases, there are dedicated management symbols, e.g., SYNC symbols, for crosstalk channel estimation and other transmission means (e.g., special symbols or data units) to carry the overhead channel which is necessary to assist channel estimation. FIGS. 5A, 5B, and 5C illustrate various framing scenarios for different types of duplexing. FIG. 5A illustrates framing for time division duplexing (TDD). FIG. 5B illustrates framing for full echo cancellation (EC) duplexing. FIG. 5C illustrates framing for partial time division echo cancellation duplexing (which is also suitable for cases of non-co-located NEXT at the CPE side, as described above). The frame construction circuitry 250 (FIG. 2) constructs frames communicating the transmit data according to a selected one of the framing scenarios.

There may be frequencies at which use of full duplex increases the sum of upstream and downstream data rate even in presence of some uncancelled NEXT (because DS SNR is still sufficiently high), while for other frequencies, the sum or weighted sum of upstream and downstream data rate is lower due to the NEXT (because no DS capacity left). Therefore, all framing options described above allow the use of FDD inside all or selected symbol positions. This means that during selected symbol positions upstream transmission occurs on a first set of particular channel frequencies (e.g., all available channel frequencies) while downstream transmission occurs on a second, different, set of transmission frequencies. Further, at other symbol positions, downstream transmission occurs on the first set of frequencies while upstream transmission occurs on a third, different, set of transmission frequencies A simple scheme of partial echo cancellation in the frequency domain is to disable upstream transmissions for frequencies on which the weighted sum of upstream and downstream data rate (with NEXT) is less than one that can be achieved by using TDD (i.e., when only DS or only US is transmitted), which gives, e.g.:

$$x_{us}^{(k)} = \begin{cases} p_{mask}^{(k)} & \text{for } \omega_{ds} b_{ds}^{(k)} + \omega_{us} b_{us}^{(k)} \geq \omega_{ds} b_{ds,nextfree}^{(k)} \\ 0 & \text{otherwise} \end{cases} \quad (4)$$

where $b^{(k)}$ is the bit allocation $$b_{ds/us/ds,nextfree,v}^{(k)} = \log_2 \left( \frac{1 + SNR_{ds/us/nextfree,v}^{(k)}}{\Gamma} \right) \quad (5)$$

To further increase the benefits of partial EC duplexing, instead of a hard decision to enable or disable certain subcarriers for full duplex transmission, the mode selection circuitry 240 may control a transmitter transmitting the frames such that the transmit PSD or power level on these subcarriers is reduced, leaving some channel capacity available, but substantially reducing the harm to the opposite transmission direction. Further, mode selection circuitry 240 may instruct transmitter components at the other end of the line that the transmit PSD of the corresponding subcarriers in the opposite direction be increased, providing even higher bit rates. This way transmit spectrum in both upstream and downstream can be optimized, allowing for maximization of the data rate in both transmission directions based on the selected optimization criterion (e.g., maximizing the US+DS data rates or providing a data rate in each direction that is above certain target, etc.) by using intermediate transmit power values. While optimization criteria and algorithms can be different, the goal of the mode selection circuitry 240 is to select an optimum partial EC duplexing mode and/or PSD level, providing the best result based on selected criteria.

The mentioned transmit spectrum optimization is based on the data rate objective and the power constraint which should be satisfied for data transmission on twisted pair lines. There are usually two transmit power constraints applied: a per-line spectral mask constraint $$\text{diag}(P_{ds/us}^{(k)}) \text{diag}(x_{ds/us}^{(k)}) P_{ds/us}^{(k),H}) \leq p_{mask}^{(k)} \forall k=1, \ldots, K \quad (6)$$

and a per-line sum-power constraint $$\Sigma_{k=1}^{K} \text{diag}(P_{ds/us}^{(k)}) \text{diag}(x_{ds/us}^{(k)}) P_{ds/us}^{(k),H}) \leq p_{sum}. \quad (7)$$

where the vector $p_{mask}^{(k)}$ collects the power limits from the spectral mask at carrier k for all lines and $p_{sum}$ is the vector of sum-power limits. $x_{ds/us}^{(k)}$ is the downstream or upstream power vector at precoder input.

Maximizing the weighted sum of upstream and downstream data rate and solving for the optimum power allocation results in different upstream/downstream ratios, which form an optimum rate region. For example, the weighted sum of upstream and downstream data rates may be set according to a criterion:

$$\max_{x_{ds,v}^{(k)}, x_{us,v}^{(k)}} \forall k, \quad (8)$$

-continued $$v\,\omega_{ds}\sum_{v=1}^{L}\sum_{k=1}^{K}\log_2\left(1+\frac{x_{ds,v}^{(k)}|H_{ds,vv}^{(k)}|^2}{\sigma^2+\Sigma_{d\in I_{dist,v}}x_{us,d}^{(k)}|H_{cpenext,vd}^{(k)}|^2}\right)+$$

$$\omega_{us}\sum_{v=1}^{L}\sum_{k=1}^{K}\log_2\left(1+\frac{x_{us,v}^{(k)}|H_{us,vv}^{(k)}|^2}{\Gamma\sigma^2}\right)$$

that is maximized, taking the un-cancelled CPE NEXT into account. The optimization problem may be solved by a gradient step towards increasing data rates according to:

$$\frac{\partial L(x_{ds,l}^{(k)},x_{us,l}^{(k)})}{\partial x_{us,l}^{(k)}}=\Sigma_{v\in I_{vict,l}}\left(\frac{|H_{cpenext,vl}^{(k)}|^2}{\sigma^2+\Sigma_{d\in I_{dist,v}}x_{us,d}^{(k)}|H_{cpenext,vd}^{(k)}|^2}-\right.\qquad(9)$$

$$\left.\frac{|H_{cpenext,vl}^{(k)}|^2}{\frac{1}{\Gamma}x_{ds,v}^{(k)}|H_{ds,vv}^{(k)}|^2+\sigma^2+\Sigma_{d\in I_{dist,v}}x_{us,d}^{(k)}|H_{cpenext,vd}^{(k)}|^2}\right)-$$

$$\frac{1}{x_{us,l}^{(k)}+\frac{\Gamma\sigma^2}{|H_{us,vv}^{(k)}|^2}},$$

where the channel estimation of the un-cancelled CPE NEXT paths is required.

Without the spectrum optimization, with full duplex used during the entire frame, only one data rate point with high upstream and low downstream rate can be reached. Spectrum optimization with different weights for upstream and downstream allows obtaining more symmetric rates and further increases the sum of upstream and downstream data rates (the selected optimization criterion).

Figure 6A:
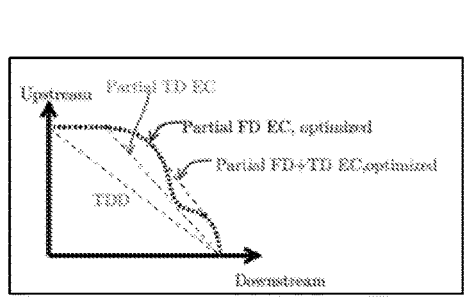
FIG. 6A illustrates data rate regions for various types of duplexing.

Partial FD/EC duplexing, as just described, potentially achieves higher aggregated (US+DS) data rates than partial TD/EC duplexing, as shown in FIG. 6A. A generic data rate region for multi-user partial EC is shown in FIG. 6A for illustration. TDD systems switch between upstream and downstream transmission and thereby, achieve a certain combination of upstream and downstream rates as indicated by the line denoted as "TDD". With partial TD/EC duplexing, the downstream transmission continues during the upstream time positions and the data rates as indicated by the line "Partial TD EC duplexing," are feasible, which are always higher than the TDD rates, while the rate gain increases when higher upstream rates are requested. The use of partial FD/EC duplexing with spectrum optimization allows the data rate to reach any point on the dashed rate region. Due to un-cancelled NEXT, the rate region of partial FD/EC duplexing is not necessarily convex. Besides that, changes of upstream/downstream data rate ratio require to re-do the spectrum optimization, which takes time and does not allow fast switching between different upstream/downstream data rate ratios.

Figure 6B:
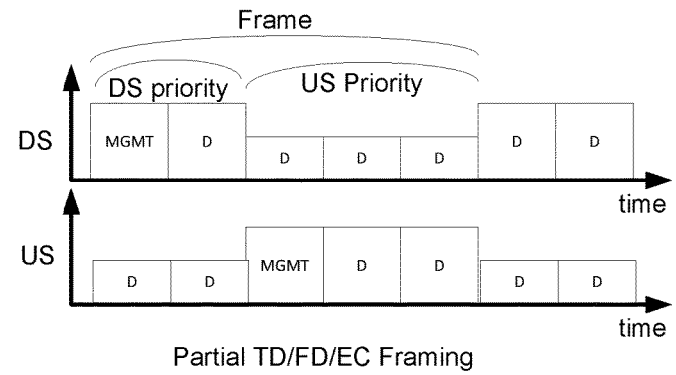
FIG. 6B illustrates an example frame constructed to perform partial time division and frequency division echo cancellation duplexing in accordance with various aspects described.

To combine the advantages of both, partial TD/EC duplexing and partial FD/EC duplexing, a frame format as shown in FIG. 6B can be used by the frame construction circuitry 250 to implement partial TD/EC duplexing mode and partial FD/EC duplexing mode plus spectrum optimization. In terms of rate regions, this corresponds to the line denoted as "Partial FD+TD EC Optimized" in FIG. 6A. The frame consists of symbols where spectrum optimization is performed with priority for downstream and other symbols where optimization is performed with priority for upstream.

Figure 7:
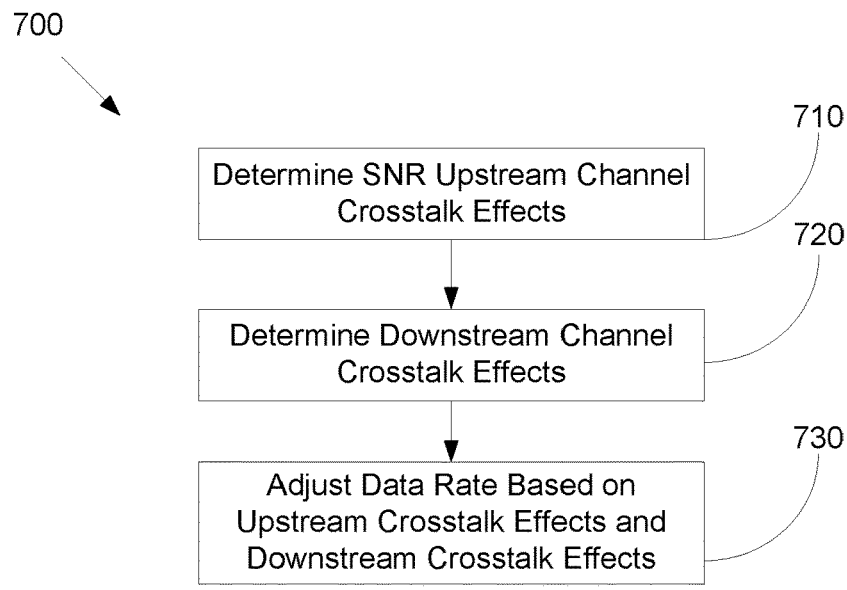
FIG. 7 illustrates a flow diagram of an example method for performing partial echo cancellation duplexing in accordance with various aspects described.

FIG. 7 illustrates a flow diagram of a method 700 for data upstream between a first device and a second device and downstream between the second device and the first device. At 710, the method includes determining crosstalk effects for an upstream channel. At 720, the method includes determining crosstalk effects for a downstream channel. The upstream or downstream crosstalk effects, or both, include NEXT from a third device (or multiple devices) that is non-co-located with respect to the first device and the second device. At 730, the method includes, based on the upstream crosstalk effects and the downstream crosstalk effects, adjusting a data rate of an upstream transmission or downstream transmission.

It can be seen from the foregoing description that the described systems, methods, and circuitries maximize the use of full duplexing using echo cancellation (EC) duplexing in multi-user lines with NEXT. Use of full EC duplexing has advantages as compared to TDD or FDD since full EC duplexing allows simultaneous transmission in both directions over same frequency spectrum, which substantially increases data rates. Depending on specific scenario and/or optimization criteria, partial EC transmission can be achieved in which full EC is not performed in all time positions and/or frequency bands. Optimization of frequency and time overlap between upstream and downstream during partial EC duplexing operation is based on actual channel conditions and upstream-to-downstream data rate ratio requirements, thereby improving the efficiency of full duplex communication. Use of overall PSD optimization in upstream and downstream communication during partial EC duplexing operation on all cross-talking lines further improves performance.

Figure 8A:
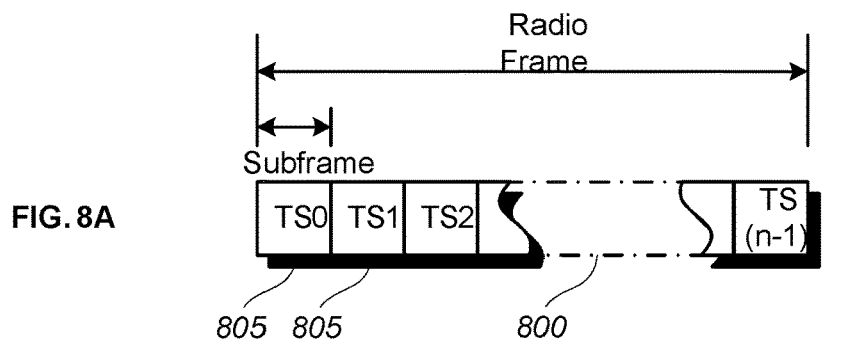
FIGS. 8A-8E illustrate frame formats that may be used in various aspects.

FIGS. 8A, 8B, 8C and 8D illustrate frame formats that may be used in various aspects. FIG. 8A illustrates a periodic frame structure 800 that may be used in various aspects. Frame structure 800 has a predetermined duration and repeats in a periodic manner with a repetition interval equal to the predetermined duration. Frame 800 is divided into two or more subframes 805. In an aspect, subframes may be of predetermined duration which may be unequal. In an alternative aspect, subframes may be of a duration which is determined dynamically and varies between subsequent repetitions of frame 800.

Figure 8B:
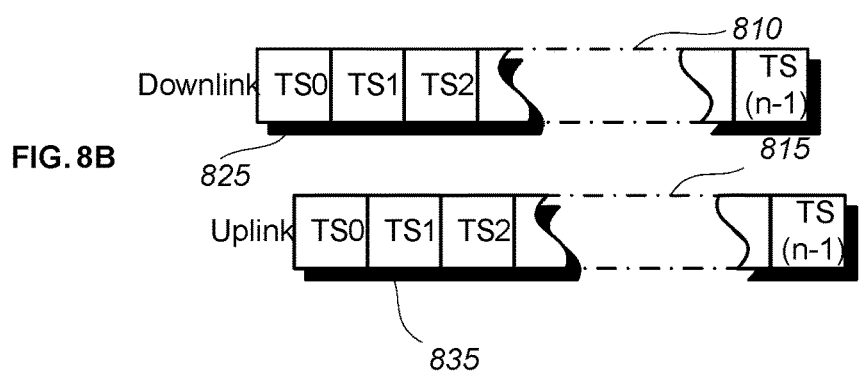
Figure 8C:
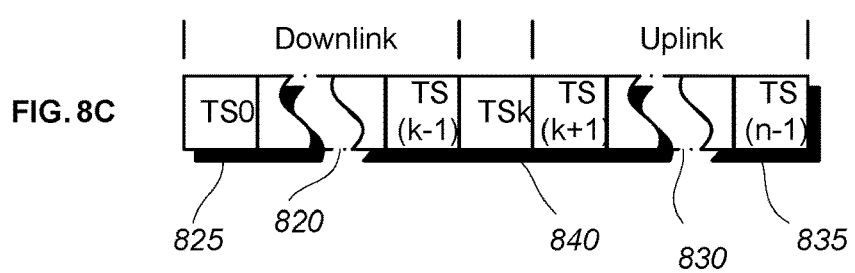

FIG. 8B illustrates an aspect of a periodic frame structure using frequency division duplexing (FDD). In an aspect of FDD, downstream frame structure 810 is transmitted by a DPU to one or CPE devices, and upstream frame structure 820 is transmitted by a combination of one or more CPE devices to a DPU.

Figure 8D:
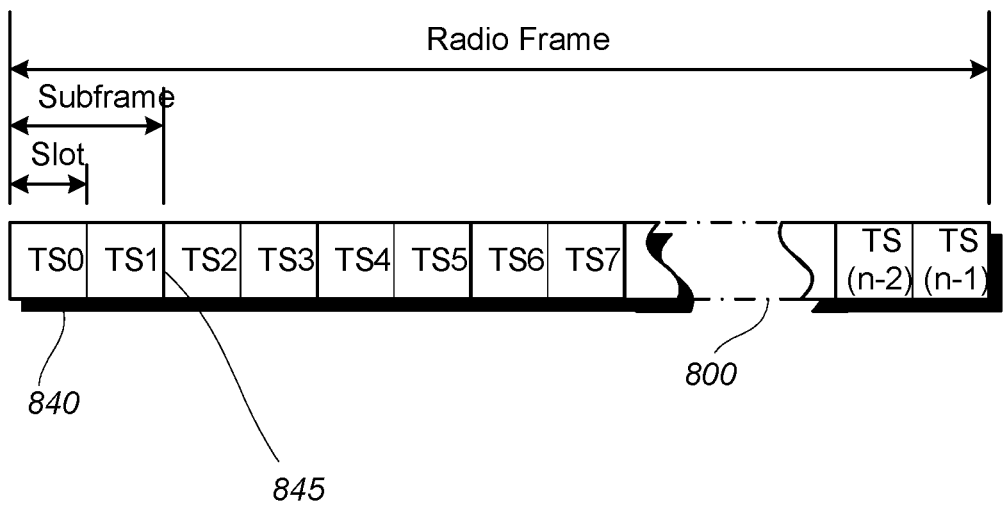

A further example of a frame structure that may be used in some aspects is shown in FIG. 8D. In this example, frame 800 has a duration of 10 ms. Frame 800 is divided into symbol positions each of duration 0.5 ms, and numbered from 0 to 19. Additionally, each pair of adjacent symbol positions numbered 2i and 2i+1, where i is an integer, is referred to as a subframe. In some aspects using the frame format of FIG. 8D, each subframe may include a combination of one or more of downstream control information, downstream data information, upstream control information and upstream data information. The combination of information types and direction may be selected independently for each subframe.

Figure 8E:
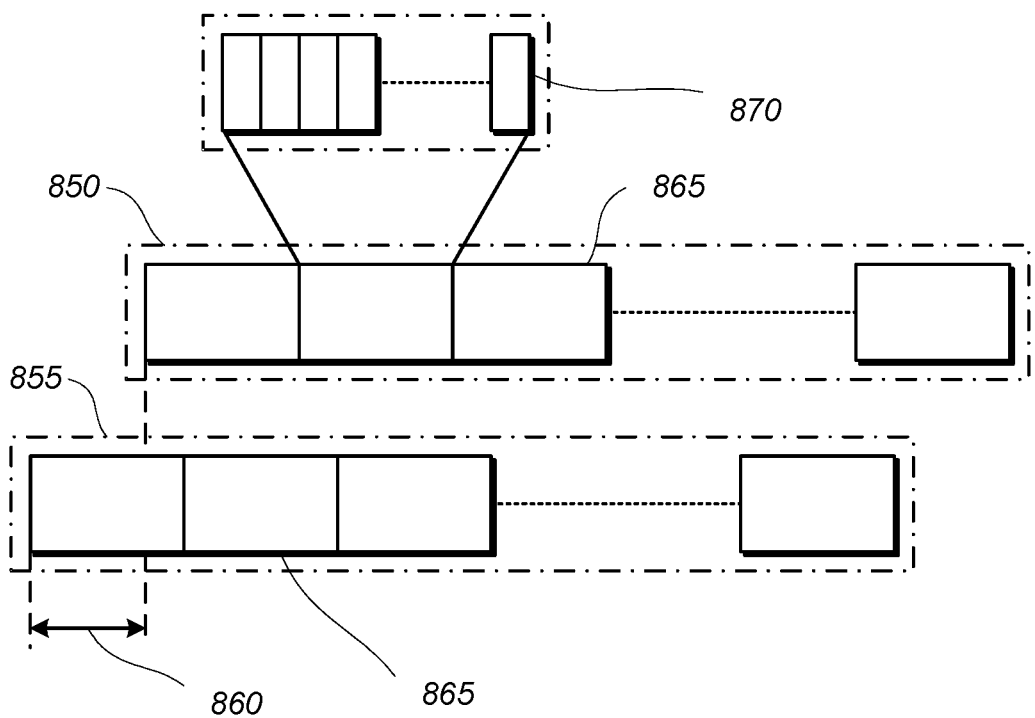

An example of a frame structure that may be used in some aspects is shown in FIG. 8E, illustrating downstream frame 850 and upstream frame 855. According to some aspects, downstream frame 850 and upstream frame 855 may have a duration of 10 ms, and upstream frame 855 may be transmitted with a timing advance 860 with respect to downstream frame 850. According to some aspects, downstream frame 850 and upstream frame 855 may each be divided into two or more subframes 865, which may be 1 ms in duration. According to some aspects, each subframe 865 may consist of one or more symbol positions 870.

In some aspects, according to the examples of FIGS. 8D and 8E, time intervals may be represented in units of $T_s$. According to some aspects of the example illustrated in FIG. 8D, $T_s$ may be defined as $1/(30{,}720 \times 1000)$ seconds. According to some aspects of FIG. 8D, a frame may be defined as having duration $30{,}720 \cdot T_s$, and a symbol position may be defined as having duration $15{,}360 \cdot T_s$. According to some aspects of the example illustrated in FIG. 8E, $T_s$ may be defined as $$T_s = 1/(\Delta f_{max} \cdot N_f),$$

where $\Delta f_{max} = 480 \times 10^3$ and $Nf = 4{,}096$. According to some aspects of the example illustrated in FIG. 8E, the number of symbol positions may be determined based on a numerology parameter, which may be related to a frequency spacing between subcarriers of a multicarrier signal used for transmission.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a partial echo cancellation duplexing system, including a channel estimation circuitry configured to determine an upstream crosstalk effect for an upstream channel between a first device and a second device and determine a downstream crosstalk effect for a downstream channel between the first device and the second device. The upstream crosstalk effect, the downstream crosstalk effect, or both, includes near end crosstalk from a third device that is non-co-located with respect to the first device and the second device. The system also includes a partial echo cancellation duplexing circuitry configured to adjust a data rate of an upstream transmission or downstream transmission based on the upstream crosstalk effect and the downstream crosstalk effect.

Example 2 includes the elements of example 1, including or omitting optional elements, wherein the channel estimation circuitry is configured to determine the upstream crosstalk effect and determining the downstream crosstalk effect by: transmitting an upstream data frame and a downstream data frame, wherein one or both of the upstream data frame and the downstream data frame include a synchronization symbol or a quiet symbol in a first symbol position; and measuring one or more of a downstream channel SNR, an upstream channel SNR, a downstream channel far end crosstalk coupling, an upstream channel far end crosstalk coupling, a downstream channel near end crosstalk coupling, and an upstream channel near end crosstalk during the first symbol position.

Example 3 includes the elements of example 2, including or omitting optional elements, wherein the channel estimation circuitry is configured to determine the upstream crosstalk effect and determining the downstream crosstalk effect by: transmitting an upstream data frame and a downstream data frame, wherein one or both of the upstream data frame and the downstream data frame include a synchronization symbol or a quiet symbol in a first symbol position and a second symbol position; measuring one or more of a downstream channel SNR, a downstream channel far end crosstalk coupling, and a downstream channel near end crosstalk coupling during the first symbol position; and measuring one or more of an upstream channel SNR, an upstream channel far end crosstalk coupling, and an upstream channel near end crosstalk coupling during the second symbol position.

Example 4 includes the elements of example 2, including or omitting optional elements, wherein both the upstream data frame and the downstream data frame include a synchronization symbol in the first symbol position.

Example 5 includes the elements of example 2, including or omitting optional elements, wherein one of the upstream data frame and the downstream data frame includes a synchronization symbol in the first symbol position and the other of the upstream data frame and the downstream data frame includes a quiet symbol in the first symbol position.

Example 6 includes the elements of examples 1-5, including or omitting optional elements, wherein the partial echo cancellation duplexing circuitry is configured to adjust the data rate by constructing an upstream data frame and a downstream data frame such that during a least one symbol position the upstream data frame or the downstream data frame or both includes data encoded on fewer channel frequencies than the other symbol positions of the same upstream data frame or the downstream data frame or both.

Example 7 includes the elements of examples 1-5, including or omitting optional elements, wherein the partial echo cancellation duplexing circuitry is configured to adjust the data rate by constructing an upstream data frame and a downstream data frame such that i) during a first symbol position the upstream data frame and the downstream data frame both include data encoded on particular channel frequencies and ii) during a second symbol position one of the upstream data frame or the downstream data frame, but not both, do not include data encoded on the particular channel frequencies.

Example 8 includes the elements of examples 1-5, including or omitting optional elements, wherein the partial echo cancellation duplexing circuitry is configured to adjust the data rate by constructing an upstream data frame and a downstream data frame such that i) during a first symbol position the upstream data frame includes data encoded on a first set of channel frequencies and the downstream data frame includes data encoded on a second set of channel frequencies that is different from the first set; and ii) during a second symbol position the downstream data frame includes data encoded on the first set of channel frequencies and the upstream data frame includes data encoded on a third set of channel frequencies that is different from the first set.

Example 9 includes the elements of examples 1-5, including or omitting optional elements, wherein the partial echo cancellation duplexing circuitry is configured to adjust the data rate by: constructing an upstream data frame and a downstream data frame and instructing a transmitter transmitting one of the upstream data frame or the downstream data frame to transmit at a reduced power during a least one symbol position in the data frame as compared to a power level used to transmit at other symbol positions in the same data frame.

Example 10 includes the elements of examples 1-5, including or omitting optional elements, wherein the partial echo cancellation duplexing circuitry is configured to adjust the data rate by: calculating an upstream data rate based on an upstream channel SNR assuming full duplex transmission; calculating a downstream data rate based on a downstream channel SNR assuming full duplex transmission; and adjusting the data rate based on a criteria that defines a target relationship between the upstream data rate and the downstream data rate.

Example 11 is a method to transmit data upstream between a first device and a second device and downstream between the second device and the first device, including: determining an upstream crosstalk effect for an upstream channel; determining a downstream crosstalk effect for a downstream channel; wherein the upstream crosstalk effect, the downstream crosstalk effect, or both, includes near end crosstalk from a third device that is non-co-located with respect to the first device and the second device; and based on the upstream crosstalk effect and the downstream crosstalk effect, adjusting a data rate of an upstream transmission or downstream transmission.

Example 12 includes the elements of example 11, including or omitting optional elements, wherein determining the upstream crosstalk effect and determining the downstream crosstalk effect includes: transmitting an upstream data frame and a downstream data frame, wherein one or both of the upstream data frame and the downstream data frame include a synchronization symbol or a quiet symbol in a first symbol position and a second symbol position; measuring one or more of a downstream channel SNR, downstream channel far end crosstalk coupling, and downstream channel near end crosstalk coupling during the first symbol position; and measuring one or more of an upstream channel SNR, upstream channel far end crosstalk coupling, and upstream channel near end crosstalk coupling during the second symbol position.

Example 13 includes the elements of example 11, including or omitting optional elements, wherein determining the upstream crosstalk effect and determining the downstream crosstalk effect includes: transmitting an upstream data frame and a downstream data frame, wherein one or both of the upstream data frame and the downstream data frame include a synchronization symbol or a quiet symbol in a first symbol position and measuring one or more of a downstream channel SNR, an upstream channel SNR, a downstream channel far end crosstalk coupling, an upstream channel far end crosstalk coupling, a downstream channel near end crosstalk coupling, and an upstream channel near end crosstalk during the first symbol position.

Example 14 includes the elements of examples 11-13, including or omitting optional elements, wherein adjusting the data rate includes constructing an upstream data frame and a downstream data frame such that during a least one symbol position the upstream data frame or the downstream data frame includes data encoded on fewer channel frequencies than the other of the upstream data frame or the downstream data frame.

Example 15 includes the elements of examples 11-13, including or omitting optional elements, wherein adjusting the data rate includes constructing an upstream data frame and a downstream data frame such that i) during a first symbol position the upstream data frame and the downstream data frame both include data encoded on particular channel frequencies and ii) during a second symbol position one of the upstream data frame or the downstream data frame, but not both, do not include data encoded on the particular channel frequencies.

Example 16 includes the elements of examples 11-13, including or omitting optional elements, wherein adjusting the data rate includes constructing an upstream data frame and a downstream data frame such that i) during a first symbol position the upstream data frame includes data encoded on a first set of channel frequencies and the downstream data frame includes data encoded on a second set of channel frequencies that is different from the first set; and ii) during a second symbol position the downstream data frame includes data encoded on the first set of channel frequencies and the upstream data frame includes data encoded on a third set of channel frequencies that is different from the first set.

Example 17 includes the elements of examples 11-13, including or omitting optional elements, wherein adjusting the data rate includes: constructing an upstream data frame and a downstream data frame and instructing a transmitter transmitting one of the upstream data frame or the downstream data frame to transmit at a reduced power during a least one symbol position in the data frames as compared to power used to transmit at other symbol positions in the data frames.

Example 18 includes the elements of examples 11-13, including or omitting optional elements, wherein adjusting the data rate includes: calculating an upstream data rate based on an upstream channel SNR assuming full duplex transmission; calculating a downstream data rate based on an downstream channel SNR assuming full duplex transmission; and adjusting the data rate based on a criteria that defines a target relationship between the upstream data rate and the downstream data rate.

Example 19 is partial echo cancellation duplexing circuitry, including: a data rate calculation circuitry configured to calculate an upstream data rate and a downstream data rate based on estimated crosstalk effects; a mode selection circuitry configured to select a full echo cancellation duplexing mode or a partial echo cancellation duplexing mode based on target data rates; and a frame construction circuitry configured to control construction and transmission of upstream data frames and downstream data frames based on the selected echo cancellation duplexing mode.

Example 20 includes the elements of example 19, including or omitting optional elements, wherein: the mode selection circuitry is configured to select a partial frequency division echo cancellation duplexing mode based on the upstream data rate and the downstream data rate; and the frame construction circuitry is configured to, in response to selection of the partial frequency division echo cancellation duplexing mode, construct an upstream data frame and a downstream data frame such that during a least one symbol position the upstream data frame or the downstream data frame includes data encoded on fewer channel frequencies than the other of the upstream data frame or the downstream data frame.

Example 21 includes the elements of example 19, including or omitting optional elements, wherein: the mode selection circuitry is configured to select a partial time division echo cancellation duplexing mode based on the upstream data rate and the downstream data rate; and the frame construction circuitry is configured to, in response to selection of the partial time division echo cancellation duplexing mode, construct an upstream data frame and a downstream data frame such that i) during a first symbol position the upstream data frame and the downstream data frame both include data encoded on particular channel frequencies and ii) during a second symbol position one of the upstream data frame or the downstream data frame, but not both, do not include data encoded on the particular channel frequencies.

Example 22 includes the elements of example 19, including or omitting optional elements, wherein: the mode selection circuitry is configured to select a partial time division and frequency division echo cancellation duplexing mode based on the upstream data rate and the downstream data rate; and the frame construction circuitry is configured to, in response to selection of the partial time division and frequency division echo cancellation duplexing mode, construct an upstream data frame and a downstream data frame such that i) during a first symbol position the upstream data frame includes data encoded on a first set of channel frequencies and the downstream data frame includes data encoded on a second set of channel frequencies that is different from the first set; and ii) during a second symbol position the downstream data frame includes data encoded on the first set of channel frequencies and the upstream data frame includes data encoded on a third set of channel frequencies that is different from the first set.

Example 23 includes the elements of example 19, including or omitting optional elements, wherein the mode selection circuitry is configured to, based on the upstream data rate and the downstream data rate, instruct a transmitter transmitting one of the upstream data frame or the downstream data frame to transmit at a reduced power during a least one symbol position in the data frame as compared to a power level used to transmit at other symbol positions in the same data frame.

Example 24 includes the elements of examples 19-23, including or omitting optional elements, wherein the data rate calculation circuitry is configured to: calculate an upstream data rate based on an upstream SNR assuming full duplex transmission; and calculate a downstream data rate based on a downstream SNR assuming full duplex transmission; and the mode selection circuitry is configured to select a mode based on a criteria that defines a target relationship between the upstream data rate and the downstream data rate.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A partial echo cancellation duplexing system, comprising:
    a channel estimation circuitry configured to:
        determine an upstream crosstalk effect for an upstream channel between a first device and a second device; and
        determine a downstream crosstalk effect for a downstream channel between the first device and the second device;
        wherein the upstream crosstalk effect, the downstream crosstalk effect, or both, includes near end crosstalk from a third device that is non-co-located with respect to the first device and the second device; and
    a partial echo cancellation duplexing circuitry configured to adjust a data rate of an upstream transmission or downstream transmission based on the upstream crosstalk effect and the downstream crosstalk effect,
    wherein the channel estimation circuitry is configured to determine the upstream crosstalk effect and the downstream crosstalk effect based on:
        transmissions of an upstream data frame and a downstream data frame, wherein one or both of the upstream data frame and the downstream data frame include a synchronization symbol or a quiet symbol in a first symbol position; and
        measurement of one or more of a downstream channel signal-to-noise ratio (SNR), an upstream channel SNR, a downstream channel far end crosstalk coupling, an upstream channel far end crosstalk coupling, a downstream channel near end crosstalk coupling, and an upstream channel near end crosstalk during the first symbol position.

2. The partial echo cancellation duplexing system of claim 1,
wherein the one or both of the upstream data frame and the downstream data frame include the synchronization symbol or the quiet symbol in the first symbol position and a second symbol position,
wherein the channel estimation circuitry is configured to determine the upstream crosstalk effect and the downstream crosstalk effect based on
measurements of one or more of a downstream channel SNR, a downstream channel far end crosstalk coupling, and a downstream channel near end crosstalk coupling during the first symbol position; and
measurement of one or more of an upstream channel SNR, an upstream channel far end crosstalk coupling, and an upstream channel near end crosstalk coupling during the second symbol position.

3. The partial echo cancellation duplexing system of claim 1, wherein both the upstream data frame and the downstream data frame include a synchronization symbol in the first symbol position.

4. The partial echo cancellation duplexing system of claim 1, wherein one of the upstream data frame and the downstream data frame includes a synchronization symbol in the first symbol position and the other of the upstream data frame and the downstream data frame includes a quiet symbol in the first symbol position.

5. The partial echo cancellation duplexing system of claim 1, wherein the partial echo cancellation duplexing circuitry is configured to adjust the data rate by constructing an upstream data frame and a downstream data frame such that during a least one symbol position the upstream data frame or the downstream data frame or both includes data encoded on fewer channel frequencies than the other symbol positions of the same upstream data frame or the downstream data frame or both.

6. The partial echo cancellation duplexing system of claim 1, wherein the partial echo cancellation duplexing circuitry is configured to adjust the data rate by constructing an upstream data frame and a downstream data frame such that i) during a first symbol position the upstream data frame and the downstream data frame both include data encoded on particular channel frequencies and ii) during a second symbol position one of the upstream data frame or the downstream data frame, but not both, do not include data encoded on the particular channel frequencies.

7. The partial echo cancellation duplexing system of claim 1, wherein the partial echo cancellation duplexing circuitry is configured to adjust the data rate by constructing an upstream data frame and a downstream data frame such that i) during a first symbol position the upstream data frame includes data encoded on a first set of channel frequencies and the downstream data frame includes data encoded on a second set of channel frequencies that is different from the first set; and ii) during a second symbol position the downstream data frame includes data encoded on the first set of channel frequencies and the upstream data frame includes data encoded on a third set of channel frequencies that is different from the first set.

8. The partial echo cancellation duplexing system of claim 1, wherein the partial echo cancellation duplexing circuitry is configured to adjust the data rate by:
constructing an upstream data frame and a downstream data frame; and
instructing a transmitter transmitting one of the upstream data frame or the downstream data frame to transmit at a reduced power during a least one symbol position in the data frame as compared to a power level used to transmit at other symbol positions in the same data frame.

9. The partial echo cancellation duplexing system of claim 1, wherein the partial echo cancellation duplexing circuitry is configured to adjust the data rate by:
calculating an upstream data rate based on an upstream channel SNR assuming full duplex transmission;
calculating a downstream data rate based on a downstream channel SNR assuming full duplex transmission; and
adjusting the data rate based on a criteria that defines a target relationship between the upstream data rate and the downstream data rate.

10. A method to transmit data upstream between a first device and a second device and downstream between the second device and the first device, comprising:
determining an upstream crosstalk effect for an upstream channel;
determining a downstream crosstalk effect for a downstream channel;
wherein the upstream crosstalk effect, the downstream crosstalk effect, or both, includes near end crosstalk from a third device that is non-co-located with respect to the first device and the second device; and
based on the upstream crosstalk effect and the downstream crosstalk effect, adjusting a data rate of an upstream transmission or downstream transmission,
wherein determining the upstream crosstalk effect and determining the downstream crosstalk effect comprise:
transmitting an upstream data frame and a downstream data frame, wherein one or both of the upstream data frame and the downstream data frame include a synchronization symbol or a quiet symbol in a first symbol position; and
measuring one or more of a downstream channel signal-to-noise ratio (SNR), an upstream channel SNR, a downstream channel far end crosstalk coupling, an upstream channel far end crosstalk coupling, a downstream channel near end crosstalk coupling, and an upstream channel near end crosstalk during the first symbol position.

11. The method of claim 10,
wherein the one or both of the upstream data frame and the downstream data frame include the synchronization symbol or the quiet symbol in the first symbol position and a second symbol position,
wherein determining the upstream crosstalk effect and determining the downstream crosstalk effect comprise measuring one or more of a downstream channel SNR, downstream channel far end crosstalk coupling, and downstream channel near end crosstalk coupling during the first symbol position; and
measuring one or more of an upstream channel SNR, upstream channel far end crosstalk coupling, and upstream channel near end crosstalk coupling during the second symbol position.

12. The method of claim 10, wherein adjusting the data rate comprises constructing an upstream data frame and a downstream data frame such that during a least one symbol position the upstream data frame or the downstream data frame includes data encoded on fewer channel frequencies than the other of the upstream data frame or the downstream data frame.

13. The method of claim 10, wherein adjusting the data rate comprises constructing an upstream data frame and a downstream data frame such that i) during a first symbol position the upstream data frame and the downstream data frame both include data encoded on particular channel frequencies and ii) during a second symbol position one of the upstream data frame or the downstream data frame, but not both, do not include data encoded on the particular channel frequencies.

14. The method of claim 10, wherein adjusting the data rate comprises constructing an upstream data frame and a downstream data frame such that i) during a first symbol position the upstream data frame includes data encoded on a first set of channel frequencies and the downstream data frame includes data encoded on a second set of channel frequencies that is different from the first set; and ii) during a second symbol position the downstream data frame includes data encoded on the first set of channel frequencies and the upstream data frame includes data encoded on a third set of channel frequencies that is different from the first set.

15. The method of claim 10, wherein adjusting the data rate comprises:
constructing an upstream data frame and a downstream data frame; and
instructing a transmitter transmitting one of the upstream data frame or the downstream data frame to transmit at a reduced power during a least one symbol position in the data frames as compared to power used to transmit at other symbol positions in the data frames.

16. The method of claim 10, wherein adjusting the data rate comprises:
calculating an upstream data rate based on an upstream channel SNR assuming full duplex transmission;
calculating a downstream data rate based on an downstream channel SNR assuming full duplex transmission; and
adjusting the data rate based on a criteria that defines a target relationship between the upstream data rate and the downstream data rate.

\* \* \* \* \*